May 17, 1966     J. B. WHITLOW     3,251,183
INTERNALLY GENERATED STEAM ENGINE
Filed May 13, 1964
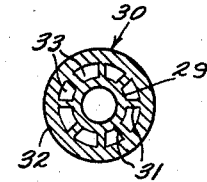
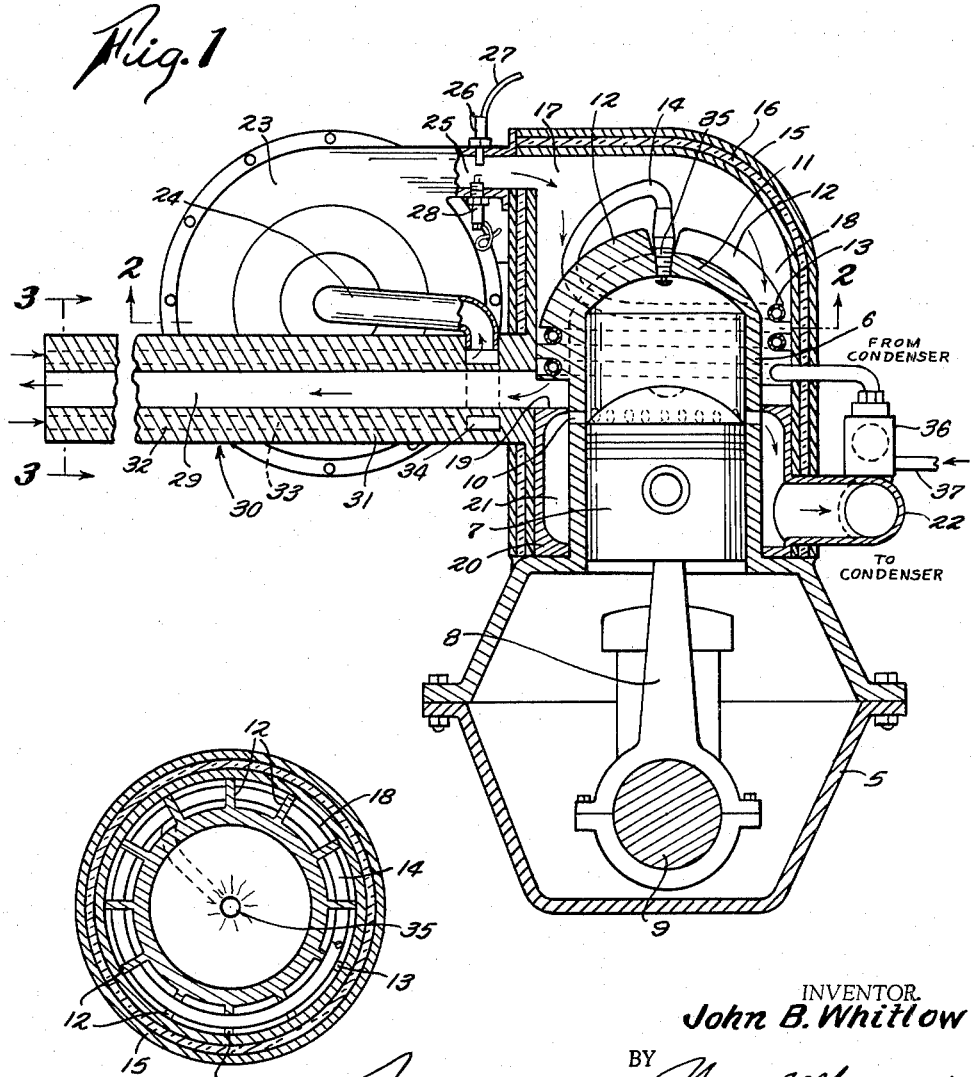
INVENTOR.
John B. Whitlow
BY ATTY.

3,251,183
INTERNALLY GENERATED STEAM ENGINE
John B. Whitlow, 132 Park Ave., Lexington, Ky.
Filed May 13, 1964, Ser. No. 367,035
5 Claims. (Cl. 60—27)

The present invention relates to a novel internally generated steam engine and is particularly directed to an internally cooled, externally heated steam engine that will effect a greater efficiency of operation and will specifically secure a highly efficient means for generating live steam in conjunction with a reciprocating piston type engine.

The underlying operating principle of my invention resides in the transference of heat energy from burned or burning fuel simultaneously to the external surfaces of a closed, steam expansion chamber and a water tube closely surrounding said chamber; the heated water under pressure in the water tube being injected into the chamber in intimate contact with the internal surface of the chamber wall and thus to efficiently convert the heated water into live steam capable of performing work whilst internally cooling the chamber. More specifically my invention relates to an improved steam engine of the single acting, piston-cylinder type wherein a water tube closely encircles the cylinder and heat energy from burned or burning fuel is intimately transferred to the exteriors of the cylinder and the water tube; the heated water in the tube being periodically injected into the cylinder in timed relation with the movements of the piston so as to come into intimate contact with the heated wall of the cylinder and become live steam in the cylinder capable of performing efficient work on the piston, the creation of said steam effecting internal cooling of the cylinder.

It is, therefore, a primary object of the invention to provide an engine which will enable the generation of steam within the working cylinder of the engine by the injection of heated water directly into the engine cylinder.

A further object of the invention is to improve the efficiency of internally generated steam engines by applying heat around the engine through the circulation of burning and burned gases; and to improve the efficiency of the engine by injecting heated water into the working chamber of the engine which is instantly converted to steam that in turn comes into intimate cooling contact with the heated walls thereof.

Still another object of the invention is to improve the efficiency of an internally generated steam engine through a preheated working cylinder and a water tube heated from the same source of heat energy that pre-heats the working cylinder, and to then inject water from the tube directly into the heated working cylinder.

These together with other objects and advantages which will subsequently be apparent preside in the details of construction and operation as will be more fully herein described and claimed, reference being had to the accompanying drawings forming a part thereof, wherein like numerals refer to like parts throughout the views, and in which:

FIG. 1 is a somewhat diagrammatic view, parts being shown in vertical section through the cylinder and piston of the engine, and illustrating a means for efficiently generating live steam within the working cylinder of the engine.

FIG. 2 is a section through the cylinder of the engine taken on line 2—2 of FIG. 1.

FIG. 3 is a section taken on line 3—3 of FIG. 1.

Referring now to the drawings in detail, wherein, for the purpose of illustration, I have disclosed a preferred embodiment of the invention, the numeral 5 designates the crank case structure of an engine which includes a conventional type of cylinder 6 having a reciprocating, working piston 7 therein connected as by a connecting rod assembly 8 to a crank shaft 9, whereby reciprocation of the piston will result in rotation of the crank shaft. The engine illustrated in the drawings is of the well known single acting, reciprocating type and the cylinder has a piston controlled, angularly spaced apart row of exhaust ports 10 formed therethrough which are shown as fully uncovered when the piston reaches its lower dead center position.

The cylinder has a dome shaped, upper end 11 which is the exact contour of the upper face of the piston 7, it being noted that a 90° arc is subtended by the dome shape of the cylinder and the piston. The cylinder is provided with heat exchange fins 12 about its upper end or head portion, the fins being notched at 13 to position a coiled, water tube 14 around the head portion of the cylinder in close proximity to the cylinder 6. Encircling and enclosing the cylinder and water tube is a casing 15 of any suitable construction but which preferably includes therein a layer of heat insulating material 16 in order to minimize heat losses from the engine. The space between the casing 15 and the cylinder 6 thus constitutes a heat exchange chamber surrounding the cylinder and water tube for the purpose of effecting a heat exchange relation between the cylinder and water tube and certain burned or burning fuel, as will be set forth more clearly hereinafter.

The heat exchange chamber is preferably divided into an upper fuel ignition compartment 17 and a lower heat exchange compartment 18, the bottom of the heat exchange compartment 18 being formed by an upper wall 19 of an exhaust steam box 20 that preferably takes the form of a sleeve pre-shrunk on the lower portion of the cylinder 6, said sleeve forming with the cylinder an annular compartment 21 which communicates with the row of exhaust ports 10 at its upper end and with a steam exhaust pipe 22 at its lower end.

Indicated generally by the numeral 23 is a blower of any suitable type, as for example a centrifugal blower that may be driven from the crank shaft 9. This blower has its input side connected to an elongated air conduit 24; a discharge conduit 25 being connected to its output side that communicates with the compartment 17. The arrangement is such that air is forced into the compartment 17 under pressure. Prior to such air discharge into the compartment 17 fuel is mixed with this air by means of a conventional form of fuel injector 26 receiving fuel from any suitable source of supply by conduit 27. The mixture of compressed air and fuel is ignited by any suitable means such as an electric spark plug 28, or the like, in a conventional manner so that burning gases are introduced by the conduit 25 under pressure into the compartment 17 from which they circulate into the heat exchange chamber 18 as burned and burning gases about the upper end of the cylinder 6, the fin structure 12 and the coils of the water tube 13 and are ultimately delivered as burned gases through a centrally positioned, elongated outlet conduit 29 to atmosphere.

In order to further improve the efficiency of the engine a heat exchange means is provided between the exhaust gases passing through conduit 29 and the intake air to the blower. For this purpose there is provided a concentric manifold assembly, indicated generally by the numeral 30. This manifold assembly includes the central exhaust conduit 29 which is provided with a number of radially extending ribs or vanes 31 (FIG. 3). Surrounding the ribs is an outer conduit 32 forming with the ribs a number of small, elongated passageways 33 which connect to the inlet side of the conduit 24 through a peripheral chamber 34 formed on the inner side of the heat exchange unit 30. The incoming air from atmosphere introduced through passageways 33 around the ribs 31 are heated by the hot exhaust gases passing through conduit 29 and it will thus be understood that the preheating of the air to the blower 23 will secure high efficiency of the heating unit for the motor.

At this point it should be observed that the water tube 13 has a plurality of coils which surround the upper end or head of the cylinder 6 and are spaced centrally of the heat exchange chamber 18 by the fins 12; the upper end of the tube being connected to and communicating with a normally closed, pressure actuated nozzle member 35 which is adapted to inject jets of radially directed heated water into and around the internal surfaces of the cylinder dome, the opposite, intake end of the water tube being connected to an intermittently operated pump 36 which is driven in timed relation with the crank shaft 9 of the motor in such a manner that jets of heated water (FIG. 2) are periodically introduced into the cylinder on each upstroke of the piston when the piston 7 is at about 6° from its top dead center position. Instantaneously with the introduction of heated water into the cylinder the jets are converted into live steam capable of performing work on the piston, such conversion also cooling the internal walls of the cylinder. It is also to be noted that at the lower end of each downstroke the piston 7 will uncover the angularly spaced apart row of exhaust ports 18 when the working piston is at 60° from its lower dead center position to exhaust steam from the cylinder.

In some instances, in the interest of greater efficiency of operation, it may be desired to recover the water vapor from the exhaust steam in the conduit 22 and condense the same for subsequent reuse by the water pump 36. To this end there may be provided a suitable condenser (not shown) associated with the engine to which the terminal end of the conduit 22 may be connected whereby water from the condenser could be introduced to the pump 36 through a line 37.

The operation of the engine will now be described and with particular reference to FIG. 1 it is now thought that the burned and burning gases produced by the blower 23 and fuel injector 26 in the conduit 25 should be introduced into the chamber 17 at a temperature of approximately 2000° Fahrenheit and at such a temperature the gases, as they pass into the lower heat exchange chamber 18 should heat the water in tube 14 to a temperature at the nozzle 35 of approximately 600° Fahrenheit and thus produce in the tube heated water under about 1500 pounds per square inch. Throttling of the engine is accomplished by regulating the amount of water alternately introduced into the water tube with each pulse of the water injector pump 36.

As has been stated my reciprocating cylinder-piston motor is of the single cylinder type and as the piston 7 begins its upward travel from the lower, dead center position shown in FIG. 1 it will close the exhaust ports 10 and compress the gases in the cylinder. As the piston approaches within 6° of its top dead center position the injector pump 36 will operate to force a jet of heated water into the cylinder through the nozzle 35. The jet of heated water will instantaneously become live steam to force the piston downwardly, the temperature falling as work is done and the steam expands. As the piston reaches about 60° from its lower, dead center position the exhaust ports 10 begin to be uncovered and are fully uncovered at the lower dead center position to permit spent steam to escape; such escape continuing through 60° of the initial movement of the piston on its upstroke till the exhaust ports are again closed thereby. During the time the exhaust ports are uncovered, steam will no longer be confined and will thus expand freely, to scavenge the cylinder of spent steam through the exhaust steam box 20 and conduit 22. It will be understood that the heated wall of the cylinder 6 will initially come in contact with the jets of live steam and aid the expansion of the steam injected into the cylinder from the nozzle 14, such expansion of steam actually cooling the cylinder wall as it expands in the cylinder and before it is exhausted through ports 10 to the exhaust conduit 22.

It will be understood that the water tube is of such length as is necessary to raise the temperature of the water at the nozzle to approximately 600° Fahrenheit, which is roughly the temperature at which water boils when it is under 1500 pounds per square inch pressure. As is the practice in diesel fuel injection systems, the water in the tube will be under a pressure created at the nozzle, and will require that a 4000 to 5000 lb. per square inch force be exerted by the injector pump to force the water into the cylinder. The pressure in the tube must always be high enough to insure that the water in it will remain liquid and not be permitted to change into steam until it has been injected into the cylinder.

Injection begins shortly before top dead center and continues a varying number of degrees dependent upon the throttle setting. The water is injected as a finely atomized mist perpendicular to the axis of the cylinder's bore and as near the inner surface of the hemispherically shaped cylinder head as practical. Being released from the high pressure inside the tube into the virtually pressureless cylinder, because of its heat, the injected water will immediately become steam. As the temperature of the water is that of wet steam at approximately 1500 lbs. per square inch, its conversion into steam is assured until the pressure inside the cylinder reaches that pressure. Being injected perpendicular to the axis of the cylinder, the steam mist will follow the contour of the domed inner surface of the cylinder head. As the cylinder and cylinder head, with their heat absorbing fins, are exposed to the flow of the burning gases, their inner surfaces will be at a higher temperature than the water at the time of its injection. Thus, the steam in following the contour of the cylinder head, will pick up heat from the metal and become superheated. The head of the piston will be heated as a consequence. The inner surfaces of the cylinder head, having given heat to the steam, are in turn cooled by the transfer. As the pressure of the steam forces the piston downward, heat is continually drawn from the cylinder head and walls, cooling those surfaces while at the same time giving more energy to the steam to apply to the piston head and to do work upon the crank shaft. As the steam expands in doing work upon the piston, its pressure falls and as the pressure drops, so does its temperature, further cooling the internal engine parts as it draws energy from them.

When approximately 60° or more from bottom dead center, the piston begins uncovering the ports in the cylinder wall that permit the almost spent steam to escape into the steam compartment around the lower portion of the cylinder and thence to be exhausted into the condenser. As the ports are uncovered, the steam pressure will drop rapidly, and as the pressure drops, so does the temperature, carrying out through the exhaust ports any excess heat residual in the engine.

Being a live gas and not an inert one, steam will exhaust itself in this engine as it does in conventional uniflow reciprocating steam engines. Additionally, in this engine, heat from the cylinder's head and walls, and the partial vacuum created in the condenser, will act as positive forces to push and to pull the spent steam from the cylinder.

The circulation of the burning gases over and around the upper part of the cylinder will cause the lower portion of it to be heated by conduction. The exhausting steam will act as a coolant for the lower cylinder, and will carry the heat it absorbs from it to the condenser where it will be conserved. The steam is returned from the condenser to the injection pump in the form of water without the loss of an appreciable amount of its thermal energy.

After the evacuation of the steam, the piston will seal the exhaust ports and will rise in an essentially voided cylinder to repeat the cycle.

The foregoing is considered as illustrative only of the principles of the invention. Further, since numerous modifications and changes will readily occur to those skilled in the art, it is not desired to limit the invention to the exact construction and operation shown and described herein and accordingly, all suitable modifications and equivalents may be resorted to that fall within the scope of the invention as claimed.

What I claim as new is:

1. A steam engine comprising a vertically disposed cylinder with a working piston therein, said cylinder having a closed end wall, heat exchange fins radiating from the external surfaces of the cylinder and the end wall and each fin lying in a plane passing through the axis of the cylinder, a coiled water tube encircling the cylinder and mounted on the fins in spaced relation with the cylinder, a casing around the cylinder and forming with the cylinder, the fins and the water tube, a heat exchange chamber, said casing also forming a combustion chamber around the end wall of the cylinder communicating with the heat exchange chamber, an inlet port in the casing communicating with the combustion chamber, means for introducing compressed air into the combustion chamber through the port, a fuel injecting means in the port, fuel ignition means in the port adjacent the fuel injecting means, a water injection nozzle in the top of the cylinder, said nozzle having an internally located spray means adapted to direct radial jets of live steam over the internal surface of the end wall of the cylinder, means connecting the upper end of the coiled water tube to the injection nozzle, pump means connected to the initial end of the coiled water tube, and means periodically actuating the pump in timed relation with the working piston of the cylinder.

2. A steam engine, as set forth in claim 1, wherein the temperature of the burned and burning gases emitted into the combustion chamber at the inlet port of the casing is maintained at approximately 2000° Fahrenheit and the water to be injected into the cylinder by the nozzle is under a nozzle pressure in the tube of about 4000 pounds per square inch and is maintained at a temperature of about 600° Fahrenheit at the nozzle.

3. In a steam engine of the class described, the combination of a closed steam chamber having a discharge port therein, a nozzle in the chamber opposite the port, said nozzle having internal spray means directing radial jets of steam over the internal wall of the chamber, heat exchange fins radiating from the external surface of the chamber, a coiled water tube encircling the chamber and mounted on the fins in spaced relation with the chamber, a casing around the chamber forming with said chamber, the fins and the coiled water tube a heat exchange chamber, means for introducing burned and burning gases into the heat exchange chamber, means for connecting the delivery end of the coiled water tube with the nozzle, and pump means connected to the intake end of the coiled water tube.

4. A steam engine comprising a cylinder having a dome shaped end wall, a working piston in the cylinder having a dome shaped end wall corresponding to the dome shaped end wall of the cylinder, a water tube surrounding the cylinder, means for introducing heating gases around the cylinder and the water tube, an injector nozzle connected with the water tube and located centrally in the dome shaped end wall of the cylinder, said nozzle being adapted to inject jets of heated water laterally across the dome shaped end wall of said cylinder, and pump means connected to the water tube and periodically driven in timed relation with the working piston in the cylinder.

5. A steam engine as set forth in claim 4 characterized by the fact that the dome shaped end walls of the cylinder and the piston each subtend an arc of substantially 90° and that said walls are in close face-to-face proximity when jets of heated water are injected into the cylinder by the nozzle.

References Cited by the Examiner

UNITED STATES PATENTS

| | | | |
|---|---|---|---|
| 332,941 | 12/1885 | Pessenger | 60—27 X |
| 1,216,777 | 2/1917 | Cooper | 60—27 X |
| 1,309,102 | 7/1919 | Rector | 60—27 |
| 1,456,226 | 5/1923 | Doble | 60—27 |
| 2,830,435 | 4/1958 | Mallory | 60—27 |
| 2,839,888 | 6/1958 | Mallory | 60—27 X |

FOREIGN PATENTS

| | | |
|---|---|---|
| 825,690 | 12/1951 | Germany. |
| 828,988 | 1/1952 | Germany. |
| 8,606 | 1896 | Great Britain. |

SAMUEL LEVINE, *Primary Examiner.*

EDGAR W. GEOGHEGAN, *Examiner.*